United States Patent
Song

(10) Patent No.: US 6,602,297 B1
(45) Date of Patent: Aug. 5, 2003

(54) MOTIONAL VIDEO BROWSING DATA STRUCTURE AND BROWSING METHOD THEREFOR

(75) Inventor: Jung-Min Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/239,530

(22) Filed: Jan. 29, 1999

(30) Foreign Application Priority Data

Dec. 5, 1998 (KR) .............................................. 98-53239

(51) Int. Cl.[7] .............................................. G06F 17/21
(52) U.S. Cl. .................................................. 715/500.1
(58) Field of Search ........................... 707/500.1, 501.1, 707/530, 3, 104.1; 345/719, 720, 721, 723

(56) References Cited

U.S. PATENT DOCUMENTS

| | | | | |
|---|---|---|---|---|
| 5,485,611 A | * | 1/1996 | Astle | 395/600 |
| 5,532,773 A | * | 7/1996 | Shaw et al. | 353/26 A |
| 5,655,117 A | | 8/1997 | Goldberg et al. | 395/613 |
| 5,664,046 A | | 9/1997 | Abecassis | 386/125 |
| 5,696,896 A | | 12/1997 | Badovinatz et al. | 395/182.02 |
| 5,696,905 A | | 12/1997 | Reimer et al. | 395/227 |
| 5,734,893 A | * | 3/1998 | Li et al. | 395/615 |
| 5,819,286 A | * | 10/1998 | Yang et al. | 707/104 |
| 5,930,783 A | * | 7/1999 | Li et al. | 707/1 |
| 5,963,203 A | * | 10/1999 | Goldberg et al. | 345/328 |
| 6,052,492 A | * | 4/2000 | Bruckhaus | 382/284 |
| 6,154,771 A | * | 11/2000 | Rangan et al. | 709/217 |
| 6,175,829 B1 | * | 1/2001 | Li et al. | 707/3 |
| 6,192,151 B1 | * | 2/2001 | Miyatake et al. | 382/190 |
| 6,236,395 B1 | * | 5/2001 | Sezan et al. | 345/325 |

FOREIGN PATENT DOCUMENTS

JP 10-234004 9/1998

* cited by examiner

Primary Examiner—Stephen S. Hong
(74) Attorney, Agent, or Firm—Fleshner & Kim, LLP

(57) ABSTRACT

A motional video browsing data structure based upon character relations is disclosed for a system and method of video browsing. In the present invention, the character relation information by which relations between a character and other characters constituting the contents of a motional video are formed and displayed, and information on the variation of relations between characters in the motional video are also displayed.

21 Claims, 6 Drawing Sheets

MOTIONAL VIDEO BROWSING DATA STRUCTURE AND BROWSING METHOD THEREFOR

BACKGROUND OF THE INVENTION

1. Field of the Invention

The present invention relates to a motional video browsing system, and more particularly to a motional video browsing data structure based upon relations between characters, including a fixed relation or changing relations over time.

2. Discussion of Related Art

Generally, a conventional method for watching a movie or drama is by directly receiving a video signal transmitted from a broadcasting station and viewing the video in a real time, or viewing the movie in a cinema. However, demand for re-view of a specific portion in the whole contents of a motional video has been gradually increasing, and with the development of various kinds of video media and technology, a motional video browsing system has been introduced in which a movie, drama or a specific portion therein can be re-viewed in response to the demand of a user.

A reproduction technique for the selected a section of a video has been introduced by Goldberg in U.S. Pat. No. 5,696,905 in which all kinds of video materials are classified in the groups, e.g. a form group, an index group, a medium group, a division group, an object group and a display group. The object and display groups display information (name of the object, position on the screen, and numerical information on the section where the object appears) for any characters or things. Only if a user selects a specific object on the table of the object group, the selected object can be displayed.

Another reproduction technique has been introduced by Reimer in U.S. Pat. No. 5,696,905 with additional information table in which additional information acquired before and after the production of video material or during the production thereof is recorded. For the preparation of the table, the positions at which characters appear, the positions at which the casts of the characters appear, the positions at which the stage properties appear and so on are recorded. If the user selects an object from the additional information table, the user's desired scene is reproduced, and if the user's desired object is a stage property, the information (e.g. production company, price) on the stage property is displayed. Furthermore, the user can be connected with the production/sale company of the corresponding stage property on the network.

Still other reproduction techniques by Abecassis in U.S. Pat. Nos. 5,664,046 and 5,696,896 proposes a video section map in which the information on each section of video materials is recorded. On the video section map, the information such as the degree of violence, the degree of suggestion, the degree of importance of contents, characters positions, and the degree of difficulty in understanding, of each section of the video materials is displayed. If the user inputs the degree of preference to a corresponding item of the video section map, only the user's desired section in the video materials is reproduced.

As discussed above, the conventional browsing methods provide items arranged simply without any relation to the objects appearing in the movie or drama, based upon the selection of the user.

However, the contents of the movie or drama generally builds around the relations between the characters. According to the development of events, the relations between the characters may not change from beginning to the end of the story or may continuously vary. Moreover, since one or more characters relate to a specific character in the movie or drama, the conventional arrangement type browsing method substantially fails to provide an accurate understanding of the story of the movie or drama to the user.

Therefore, to easily browse the contents of the movie or drama on the basis of the relations between the characters who play significant roles in developing a story of the movie or drama, a novel motional video browsing method which can solve the problems which appear in the conventional character arrangement type browsing method should be suggested.

SUMMARY OF THE INVENTION

Accordingly, an object of the present invention is to solve at least the problems and disadvantages of the related art.

An object of the present invention is to provide a video browsing data structure and browsing method based upon relations between characters in which the contents of the motional video are displayed as the relations between the characters.

Another object of the present invention is to provide a video browsing data structure and browsing method based upon the relations between characters in which a user can view a selected portion of a movie or drama by selecting a specific relation between two characters.

Still another object of the present invention is to provide a video browsing data structure and browsing method based upon relations between characters in which the relations between a specific character and a plurality of characters are displayed and a user can view a selected portion of a movie or drama by selecting a specific relation between two characters.

A further object of the present invention is to provide a video browsing data structure and browsing method based upon relations between characters in which fixed relations between the characters and variations of relations between a specific character and other characters are displayed, and a user can view a selected portion of a movie or drama by selecting a specific relation variation between two characters.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video browsing data structure based upon relations between characters includes character relation information by which the relations between the characters of a motional video are displayed, and information indicating a corresponding motion video section and a representative scene of the events in the development of the contents in the relations between the characters are displayed.

According to another embodiment of the present invention, a video browsing method based upon relations between characters includes the steps of: forming browsing data with which a graph indicating relations between leading characters and other characters of a motional video is established; and establishing the position information of sections corresponding to the relations and the position information of the representative scene representative of the sections; displaying the graph indicating the relations between the characters on the motional video; and if at least one relation is selected from the displayed graph, displaying the representative scene of the sections existing within the selected character relation on the basis of the position information.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 1:
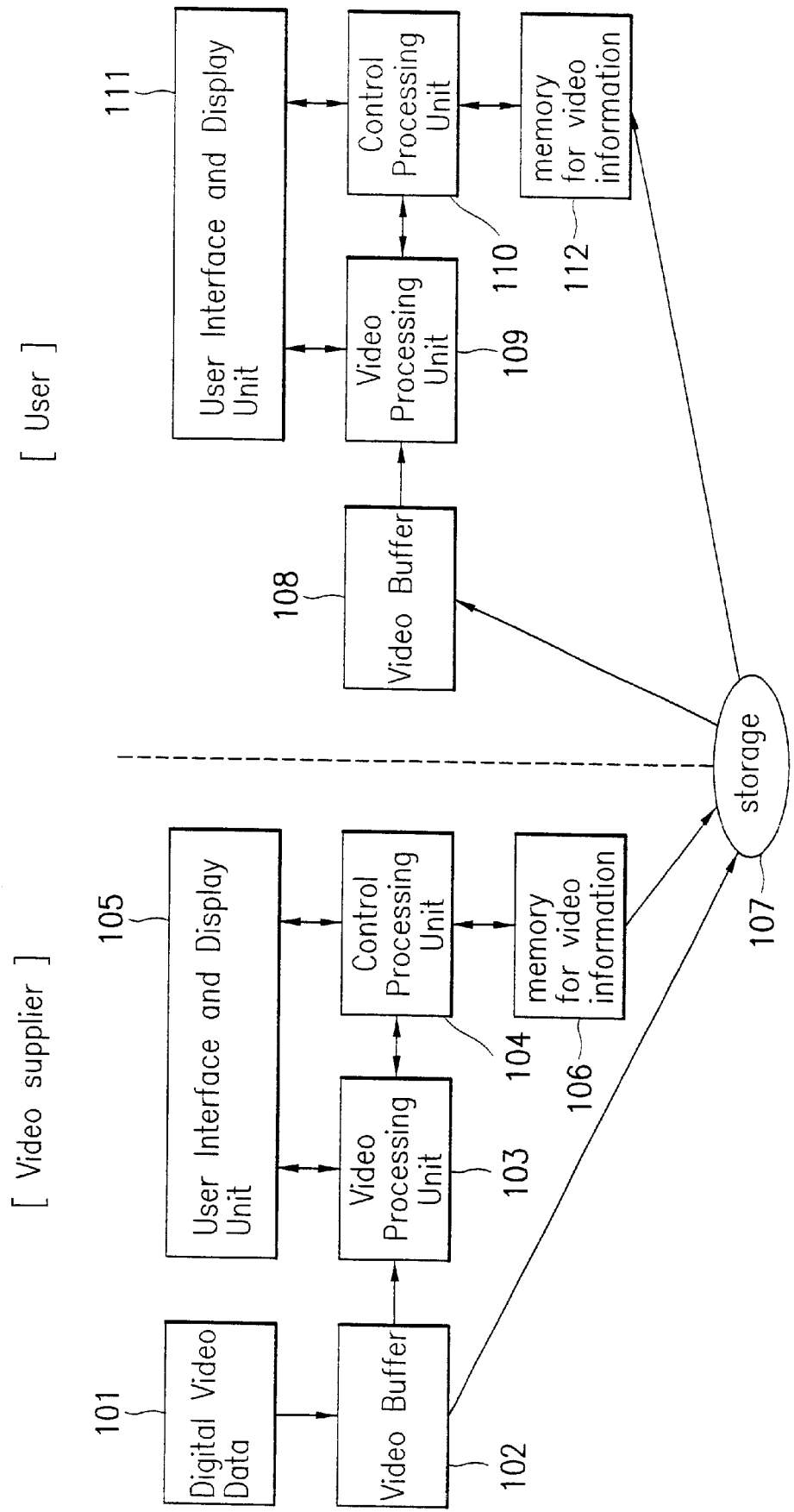
FIG. 1 is a block diagram of a video browsing system according to the present invention.

FIG. 1 shows a video browsing system according to the present invention. To facilitate the explanation of the system, the system for the video supplier and the system for the user have been separately illustrated. The video supplier develops a browsing database based upon the relations between characters. The browsing data is provided to the user such that the user may perform motional video browsing.

Particularly, digital video data 101 is temporarily stored in a video buffer 102, and the stored digital video data 101 is changed to a multimedia video stream file under the control of a video processing unit 103. A control processing unit 104 produces information required for motional browsing, or reads and processes the information previously stored fox motional browsing. A user interface and display unit 105 displays the video data processed by the video processing unit 103 and the control processing unit 104, and provides an interface for receiving user information for formatting and displaying the data.

The information of the relations between characters is processed in the control processing unit 104 and is temporarily stored in a memory for video information 106. The stored information is then input in an appropriate format to a storage 107 with the video data stored in the video buffer 102. The video data stored in the storage 107 and the browsing information are provided to the user through a recording media or wire/wireless broadcast communication network.

From the browser's side, the video data and the information on the relations between characters are received from the storage 107. The video data reads and stores the video data from the storage 107. The data stored in a video buffer 108 is then processed in a video processing unit 109 and a control processing unit 110. At the same time, the relation data between characters is received and processed in a memory for video information 112. Through a user interface and display unit 111, the processed data is displayed according to the processed relation data.

The video supplier develops a data structure for the motional video browsing system based upon the relations between characters and displays the developed data structure through a user interface and display unit 105, as shown in FIGS. 2 to 6. Thus, a user may perform motional video browsing operations as shown in FIGS. 3 to 6 through the user interface and display unit 111.

The video browser based upon the relations between characters comprises a character screen on which characters appearing on the contents of the motional video such as a movie, a drama are displayed; a main screen on which the contents of the motional video are displayed; and a main scene screen on which main scenes in sections having arbitrary lengths in the motional video are displayed. The character screen includes a leading character screen, a leading character relation screen, a whole character relation screen, a specific character relation screen, and a specific character relation variation screen.

The leading character is determined upon the number of times of a character appears in the contents of the motional video. The characters are arranged on the leading character screen in the order of the character having the greatest number of appearances.

The relations between characters are defined by the status between the characters such as a married couple, a lover, a co-worker, etc. The variation of a relation of a specific character depends upon the change of the meaningful relation between the specific character and other characters or upon the variation of the events occurring between the characters.

The motional video browsing data based upon the relations between characters may be produced in the following order. First, the characters of the whole motional video such as a movie, a drama are selected and the leading characters among the selected characters are determined according to the number of appearance scenes of the characters. Next, a representative scene among the scenes in which each character appears is established and the position information for the appearance scenes and the representative scene are set. The position information may comprise of a frame number of the section and scene.

Subsequently, the relations between the characters are defined. A one to one relation between characters, relations between a specific character and a plurality of characters, and/or variation of the relation between the characters to a specific character as the contents of the motional video are developed may be defined. The status, e.g. a married couple, a lover, a co-worker, of the meaningful relation are assigned to each relation and the number of scenes on which the related characters appear together is obtained.

The relation information may be recorded in a storage such as on a multimedia stream of header. Thereafter, the motional video reproducing (browsing) system detects and reads the above information which has been recorded on the multimedia stream of header, allowing a browsing operation of the contents of the motional video in connection with the relations between characters.

Figure 2:
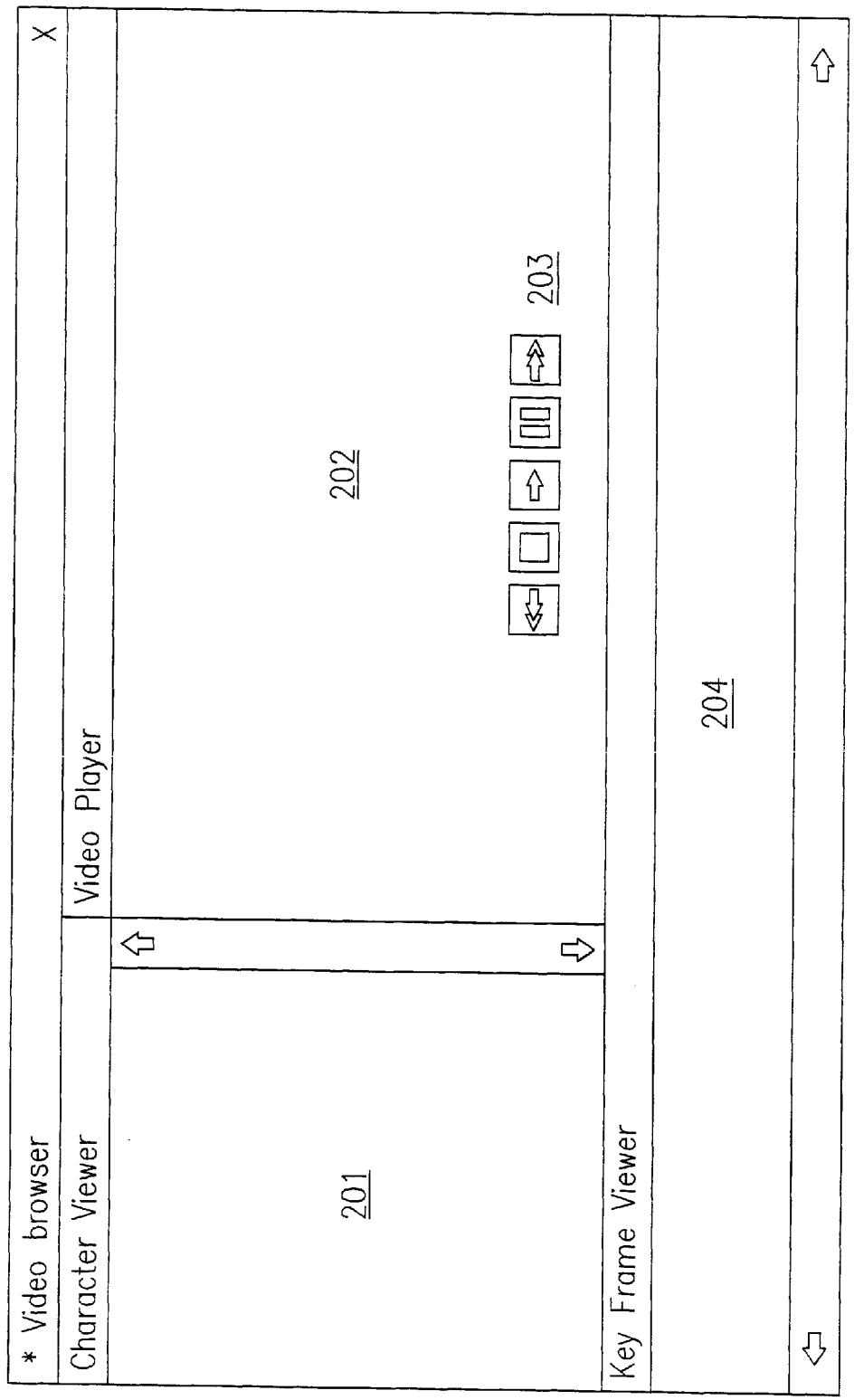
FIG. 2 illustrates a screen construction of a video browser according to the present invention.

FIG. 2 illustrates a viewer construction of the video browser based upon the relations between characters according to the present invention. A character viewer 201 displays the characters, the leading characters, the relations between the characters, the relations between a specific character and other characters, and variations of relations between a specific character and the characters related to the specific character. A video player 202 shows a movie or drama, in which a play control buttons 203 are included to play the scene selected by a user. A key frame viewer 204 shows the key frames corresponding to the scenes having an arbitrary length.

Figure 3:
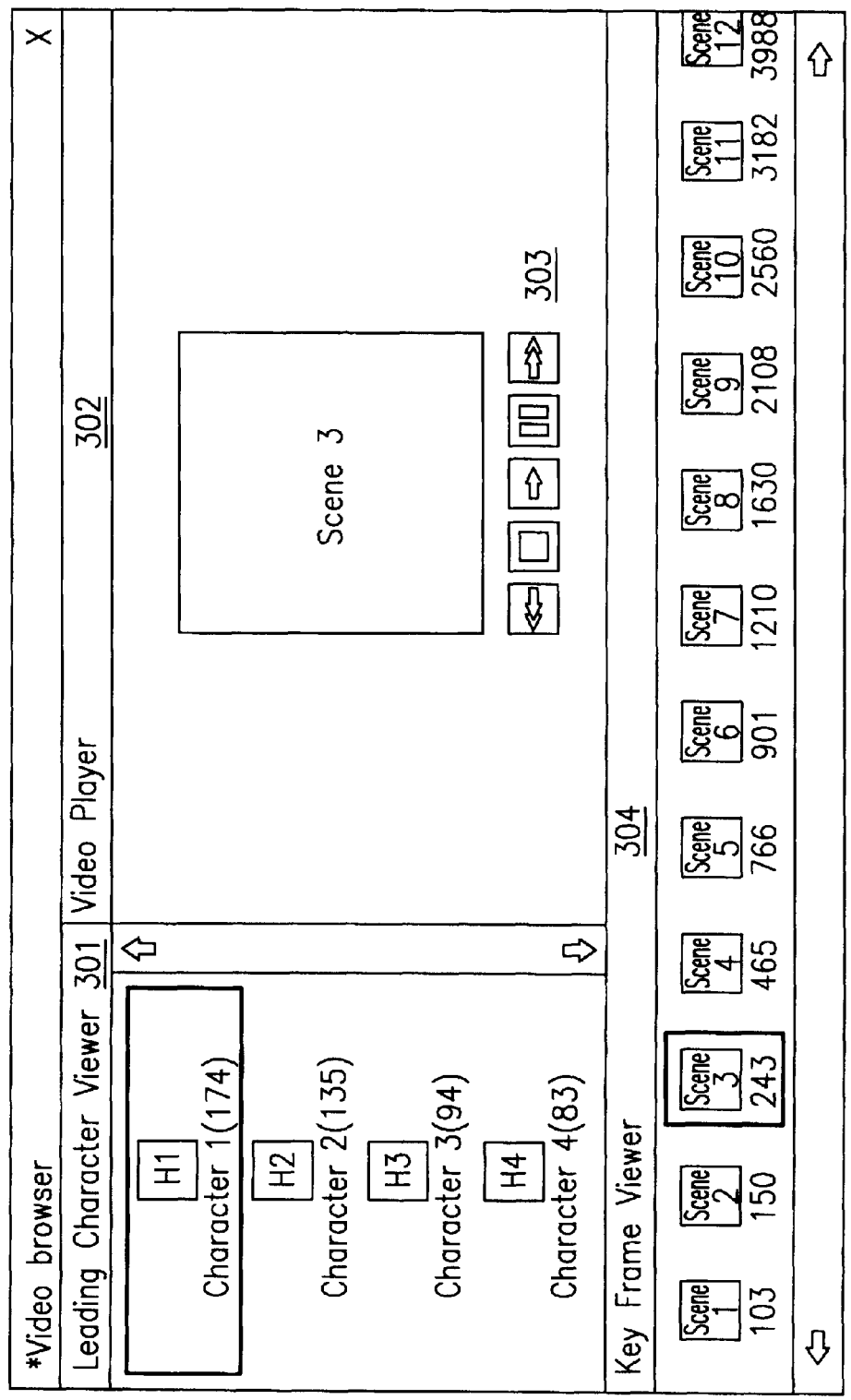
FIG. 3 illustrates a different screen of the screen in the video browser of FIG, 2.

FIG. 3 illustrates an example of displaying the leading characters on the character viewer. Particularly, a leading character viewer 301 arranges the characters having the largest number of appearance frames and the characters having the smallest number of appearance frames from top to bottom of the viewer. Also, representative frames (H1–H4) and the number of appearance frame (a numerical number in the parentheses) to characters 1–4 are assigned, respectively.

If a user selects a specific character from the leading character viewer 301, the key frames of the scenes in which the selected character appears are displayed (arranged by a frame number) on the key frame viewer 304. For example, if the user selects scene 3 on the key frame viewer 304, the key frame of the selected scene 3 is displayed on the video player 302 and the section corresponding to scene 3 is shown in response to the input through the play control buttons 303.

Figure 4:
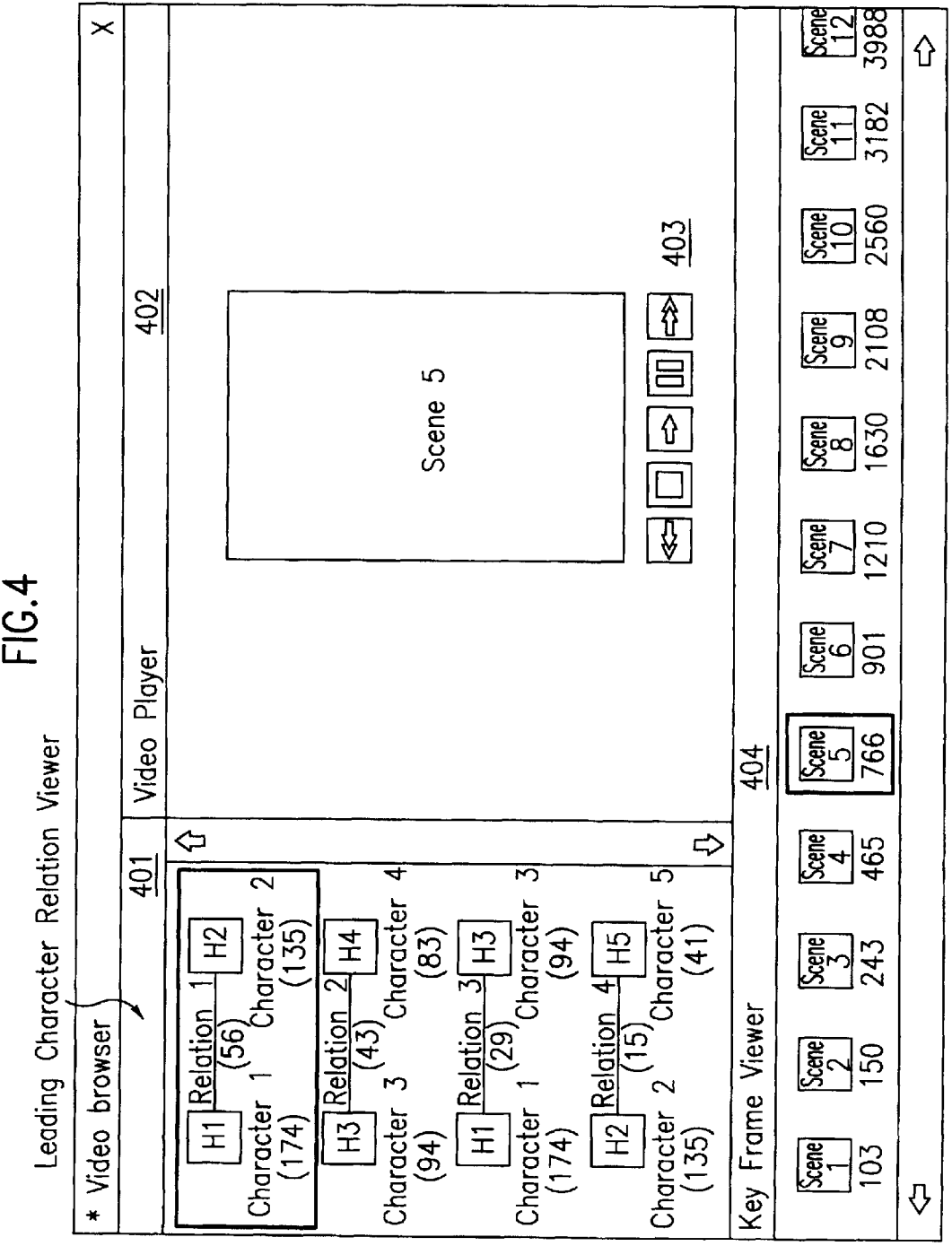
FIG. 4 illustrates a screen of the video browser of FIG. 2 in connection with relations between leading characters.

FIG. 4 illustrates an example of displaying the relations between the leading characters in the character viewer, from which a corresponding motional video section can be browsed.

A leading character relation viewer 401 displays one to one relations between the leading characters, and additionally assigns the representative frames and the number of character appearances in parenthesis beneath the each character.

The leading character relation viewer 401 arranges relations between characters in the order of frequency of the relations therebetween. Namely, the frequency number, which is the number of frames in which the two related characters appears together, is displayed. Thus, if the number of frame in which two related characters appears together is large, the relation between the characters is arranged on the upper portion of the leading character relation viewer 401, and if small, the relation is on the lower portion thereof.

In FIG. 4, the number of frames in which the character 1 with representative frame H1 and the character 2 with representative frame H2 appear together '56' times. Having the largest appearance scenes, the relation is arranged in the uppermost position of the leading character relation viewer 401. On the other hand, the number of frames in which the character 2 with representative frame H2 and the character 5 with representative frame H5 appear together is '15' times. Having the smallest appearance scenes, the relation is arranged in the lowermost position of the main character relation screen 401. Also, the status (relations 1–4) of the meaningful relations between the characters are displayed.

If a user selects an arbitrary relation on the leading character relation viewer 401, the key frames of the scenes in which the selected characters appear are displayed (arranged by a frame number) on a key frame viewer 404. For example, if the user selects scene 5 on the key frame viewer 404, the key frame of the selected scene 5 is displayed on the video player 402 and the section corresponding to scene 5 is shown in response to the input through the play control buttons 403.

Figure 5:
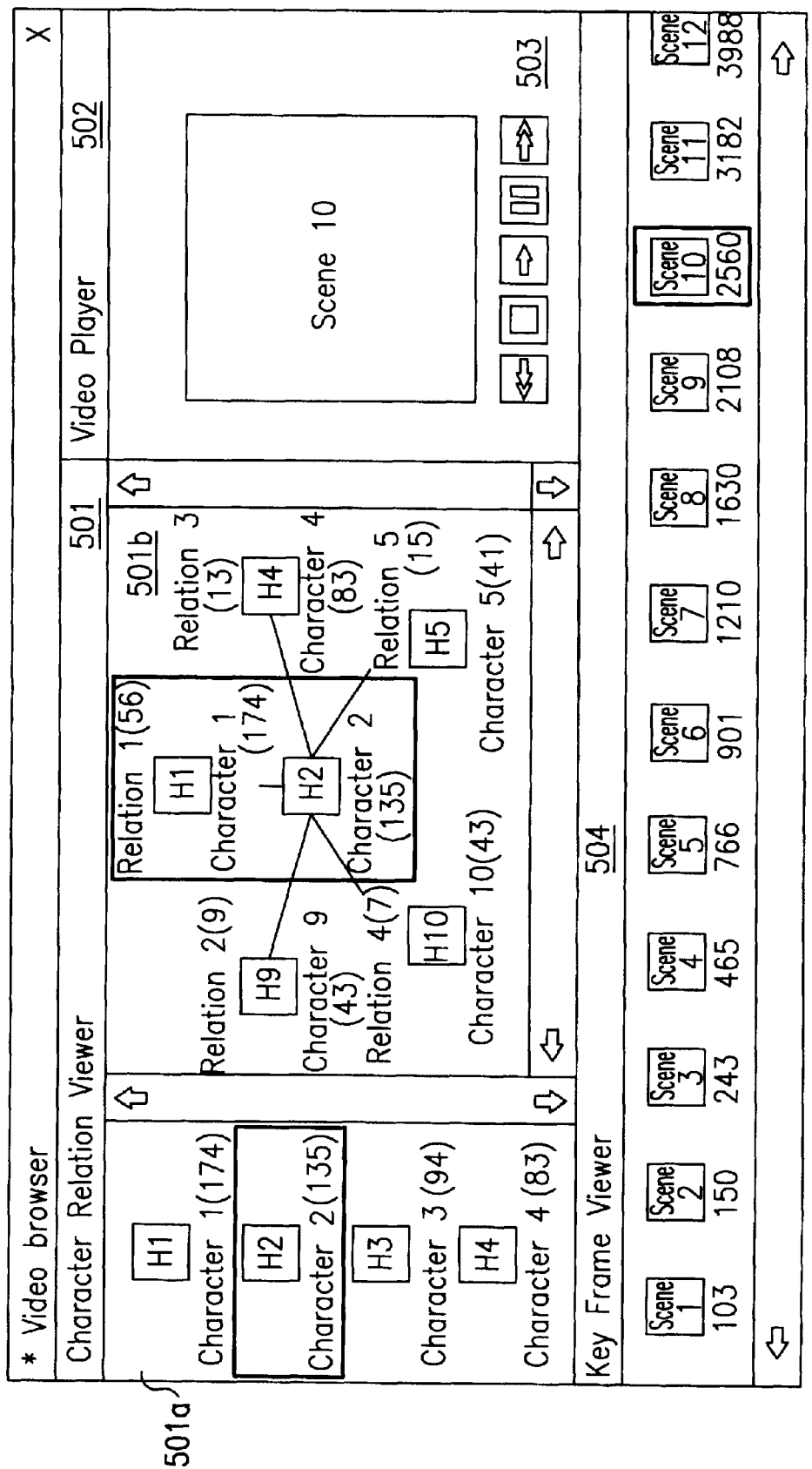
FIG. 5 illustrates a screen of the video browser of FIG. 2 in connection with relations between a specific character and a plurality of characters.

FIG. 5 illustrates an example of displaying the relations between a specific character and a plurality of characters in the character viewer, from which a corresponding motional video section can be browsed. A character viewer 501a of a specific character relation viewer 501 displays characters and the number of appearance times of each character.

If a specific character, for example character 2 with representative frame H2, is selected, a relation viewer 501b displays the relations between the character 2 and the related characters. Particularly, the representative frames and the number of character appearances are assigned to each character, and the status of the meaningful relations and the number of frequency of appearance frame in which the related characters appear together are displayed thereon.

If the user selects an arbitrary relation on the relation screen 501b, the key frames of the scenes in which the selected characters appear are displayed by representative frame (arranged by a frame number) on a key frame viewer 504. For example, if the user selects scene 10 on the key frame viewer 504, the key frame of the selected scene 10 is displayed on the video player 502 and the section corresponding to scene 10 is played in response to inputs received through the play control buttons 503.

Figure 6:
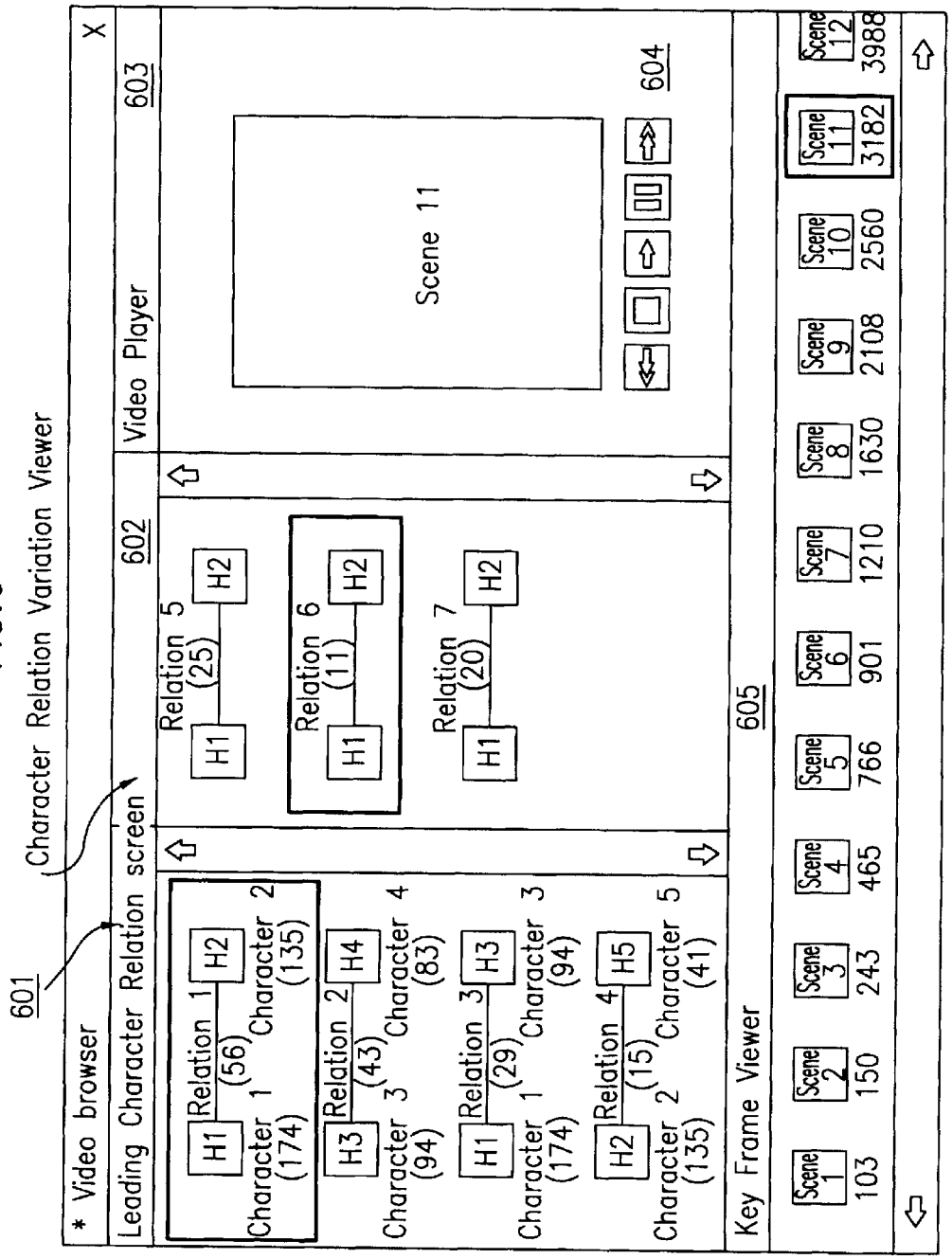
FIG. 6 illustrates a screen of the video browser of FIG. 2 in connection with variations of relations between the characters.

FIG. 6 illustrates an example displaying the variations of the relations between a specific character and a plurality of characters in the character viewer, from which a corresponding motional video section can be browsed. A leading character relation viewer 601 displays the characters, the representative frame of the character, the status of the meaningful relations between the characters, and the number of frequency of frames in which the related characters appear together. The leading character relation viewer 601 is the same as the leading character relation viewer 401 of FIG. 4. However, if a specific character relation is selected, the variations of the relation between the selected characters are displayed on a character relation variation viewer 602.

For example, if the relation between the character 1 with representative frame H1 and the character 2 with representative frame H2 is selected on the leading character relation viewer, the character relation variation viewer 602 displays the status of the meaningful relation according to the variations of the relationship between the character 1 and the character 2.

If the user selects an arbitrary relation on the character relation variation viewer 602, the key frames of the scenes in which the selected characters appear together are displayed (arranged by a frame number) on a key frame viewer 605. For example, if the user selects scene 11 on the key frame viewer 605, the key frame of the selected scene 11 is displayed on the video player 603 and the section corresponding to scene 11 is played in response to the input received through the play control buttons 604.

According to the present invention, the browsing of the motional video contents is performed based upon of the relations between characters who play substantially roles in developing the contents of the motional video such as a movie or drama. As a result, the user may easily play and view a specific section related to the story of the movie or drama. Moreover, the characters who play substantial roles are not limited to human beings.

In addition, the present invention may be implemented in a video on demand (VOD) system in the broadcasting field, which transmits only the user's desired contents, such that the user may reproduce and view the desired contents of the movie or drama within a short period of time. This results in an efficient use of network resource.

Moreover, the present invention may be implemented in video reproducing equipments for use in homes or broadcasting stations, such that the user can easily browse the desired contents in the stored movie or drama in connection with relations between characters.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video browsing systems comprising:
   a character viewer configured to display at least one character of a video story;
   a key frame viewer configured to display at least one key frame of each scene of the video story in which a character selected from the character viewer appears; and
   a video player configured to display the at least one key frame of a selected scene, and configured to display a section of the video story corresponding to the selected scene in response to user input commands, wherein the character viewer displays relations between characters in the video story and wherein the key frame viewer displays at least one key frame of a scene of the video story in which the characters in a selected relation appear together.

2. The system of claim 1, wherein the character viewer further displays a representative frame of the displayed character, and wherein the character viewer further displays a number of frames in which the displayed character appears in the video story.

3. The system of claim 2, wherein the characters are displayed in the order from the highest number of frames to the lowest number of frames in which the displayed character appears in the video story.

4. The system of claim 1, wherein the character relation is displayed by a status describing the meaningful relation between the characters.

5. The system of claim 1, wherein the character viewer further displays a representative frame of the displayed characters, and wherein the character viewer further displays a first number of frames in which the characters in a relation appear together.

6. The system of claim 5, wherein the character viewer further displays a second number of frames in which each of the displayed characters appears in the video story.

7. The system of claim 1, further comprising a character relation variation viewer displaying variations of the relations between the characters in a selected relation and wherein the key frame viewer displays at least one key frame of a scene of the video story in which the characters in a selected variation of the relation appear together.

8. The system of claim 1, wherein the character viewer further displays relations between a specific character and other characters in the video story, and wherein the key frame viewer displays at least one key frame of scene of the video story in which the specific character and other characters in a selected relation appear together.

9. The system of claim 8, wherein the character relation is displayed by a status describing the meaningful relation between the characters.

10. The system of claim 8, wherein the character viewer further displays a representative frame of the displayed characters, wherein the character viewer further displays a number of frames in which the characters in a relation appear together.

11. The method of claim 1, wherein the key frame viewer displays only scenes associated with the selected character.

12. A video browsing method comprising:
    (a) displaying at least one character of a video story;
    (b) displaying at least one key frame of each scene of the video story in which a selected character appears; and
    (c) displaying a section of the video story corresponding to a selected scene in response to user input commands, and wherein step (a) further comprises displaying relations between characters in the video story and wherein step (b) displays at least one key frame of a scene of the video story in which the characters in a selected relation appear together.

13. The method of claim 12, wherein step (a) further comprises displaying a representative frame of the displayed character, and displaying a number of frames in which the displayed character appears in the video story.

14. The method of claim 13, wherein step (a) further comprises displaying the characters in an order from a highest number of frames to a lowest number of frames in which the displayed character appears in the video story.

15. The method of claim 12, wherein step (a) further comprises displaying relations between a specific character and other characters in the video story, and wherein step (b) displays at least one key frame of a scene of the video story in which the specific character and other characters in a selected relation appear together.

16. A method for constructing multimedia data in a video browsing system comprising:
    establishing at least one relationship between characters of a video story for display in a video browsing system;
    establishing at least one scene of a video story in which the characters in the at least one relationship appear together, said at least one scene being linked to the corresponding at least one relationship; and
    establishing at least one key frame linked to each of said at least one scene of the video story in which the characters in the at least one relationship appear together for display in the video browsing system.

17. The data structure of claim 16, wherein said at least one relationship is a relationship between a specific character and other characters in the video story.

18. The data structure of claim 16, wherein said at least one relationship is a plurality of different relationships between two same characters.

19. The method of claim 12, wherein displaying the at least one key frame further comprises displaying only scenes associated with the selected character.

20. A computer readable medium having stored thereon a sequence of instructions which, when executed by a processor, cause the processor to perform a sequence of steps, comprising:
    displaying at least one character of a video story;
    displaying at least one key frame of each scene of the video story in which a selected character appears; and
    displaying a section of the video story corresponding to a selected scene in response to user input commands, wherein displaying the at least one character of the video story further comprises displaying relations between characters in the video story.

21. The computer readable medium of claim 20, wherein displaying at least one key frame further comprises displaying at least one key frame of a scene of the video story in which the characters in a selected relationship appear together.

* * * * *